(12) United States Patent
Lee (10) Patent No.: US 9,716,281 B2
(45) Date of Patent: *Jul. 25, 2017

(54) FUEL CELL ELECTRODE AND METHOD FOR MANUFACTURING MEMBRANE-ELECTRODE ASSEMBLY USING THE SAME

(71) Applicant: Hyundai Motor Company, Seoul (KR)

(72) Inventor: Jae Seung Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 167 days.

This patent is subject to a terminal disclaimer.

(21) Appl. No.: 14/509,488

(22) Filed: Oct. 8, 2014

(65) Prior Publication Data

US 2015/0030969 A1 Jan. 29, 2015

Related U.S. Application Data

(62) Division of application No. 13/315,882, filed on Dec. 9, 2011, now Pat. No. 9,356,299.

(30) Foreign Application Priority Data

Oct. 7, 2011 (KR) ........................ 10-2011-0102144

(51) Int. Cl.
| | |
|---|---|
| H01M 4/92 | (2006.01) |
| H01M 4/86 | (2006.01) |
| H01M 4/88 | (2006.01) |
| H01M 8/1018 | (2016.01) |

(52) U.S. Cl.
CPC ......... *H01M 4/926* (2013.01); *H01M 4/8663* (2013.01); *H01M 4/8673* (2013.01); *H01M 4/8828* (2013.01); *H01M 4/8882* (2013.01); *H01M 4/921* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 5,523,181 A | 6/1996 | Stonehart et al. |
|---|---|---|
| 2004/0009388 A1 | 1/2004 | Faguy |
| 2005/0053826 A1 | 3/2005 | Wang et al. |
| 2006/0258527 A1 | 11/2006 | Yoo et al. |

FOREIGN PATENT DOCUMENTS

| CN | 1783556 A | 6/2006 |
|---|---|---|
| CN | 1906783 A | 1/2007 |
| CN | 101337184 A | 1/2009 |
| JP | 2006-278233 | 10/2006 |
| JP | 2011-119217 A | 6/2011 |

(Continued)

*Primary Examiner* — Sarah A Slifka
(74) *Attorney, Agent, or Firm* — Mintz Levin Cohn Ferris Glovsky and Popeo, P.C.

(57) ABSTRACT

The present invention provides a fuel cell electrode, and a method for manufacturing a membrane-electrode assembly (MEA) using the same. The fuel cell electrode is formed by adding carbon nanotubes to reinforce the mechanical strength of the electrode, cerium-zirconium oxide particles to prevent corrosion of a polymer electrolyte membrane, and an alloy catalyst prepared by alloying a second metal (such as Ir, Pd, Cu, Co, Cr, Ni, Mn, Mo, Au, Ag, V, etc.) with platinum to prevent the dissolution, migration, and agglomeration of platinum.

3 Claims, 9 Drawing Sheets

● : Platinum-based quaternary alloy

▓ : Carbon support (56) References Cited

FOREIGN PATENT DOCUMENTS

| KR | 10-2005-0089324 | 9/2005 |
|----|-----------------|--------|
| KR | 10-2006-0082595 | 7/2006 |
| KR | 10-2006-0097589 A | 9/2006 |
| KR | 1020070011158 | 1/2007 |
| KR | 10-2011-0060094 | 6/2011 |

FIG.1

PRIOR ART

FIG. 2

PRIOR ART

FIG.3

PRIOR ART

● : Platinum-based quaternary alloy

: Carbon support

● : Platinum-based first binary alloy catalyst   ● : Second binary alloy catalyst
▓ : Carbon support

FIG. 8

● : Platinum-based binary alloy   ⌇ : Carbon fiber
▓ : Carbon support                ● : CeZrO₄

FUEL CELL ELECTRODE AND METHOD FOR MANUFACTURING MEMBRANE-ELECTRODE ASSEMBLY USING THE SAME

CROSS-REFERENCE TO RELATED APPLICATION

This application is a Divisional Application of U.S. patent application Ser. No. 13/315,882, filed Dec. 9, 2011 which claims under 35 U.S.C. §119(a) the benefit of Korean Patent Application No. 10-2011-0102144 filed Oct. 7, 2011, the entire contents of which are incorporated herein by reference.

BACKGROUND (a) Technical Field

The present invention relates to a fuel cell electrode and a method for manufacturing a membrane-electrode assembly (MEA) using the same. More particularly, it relates to a fuel cell electrode, which has excellent physical and chemical durability, and a method for manufacturing a membrane-electrode assembly (MEA) using the same.

(b) Background Art

A fuel cell stack, which generates electricity in a fuel cell system, has a structure in which several tens to several hundreds of unit cells, each comprising an MEA and a separator, are stacked together.

The MEA comprises a polymer electrolyte membrane, as well as a negative electrode and a positive electrode, which are disposed on either side of the polymer electrolyte membrane. The negative electrode (also known as the "hydrogen electrode", "fuel electrode", "anode", or "oxidizing electrode) and the positive electrode (also known as the "air electrode", "oxygen electrode", "cathode", or "reducing electrode") are configured so that a catalyst layer including platinum catalyst nanoparticles is formed on an electrode backing layer, which may include, for example, carbon paper or carbon cloth.

Figure 1:
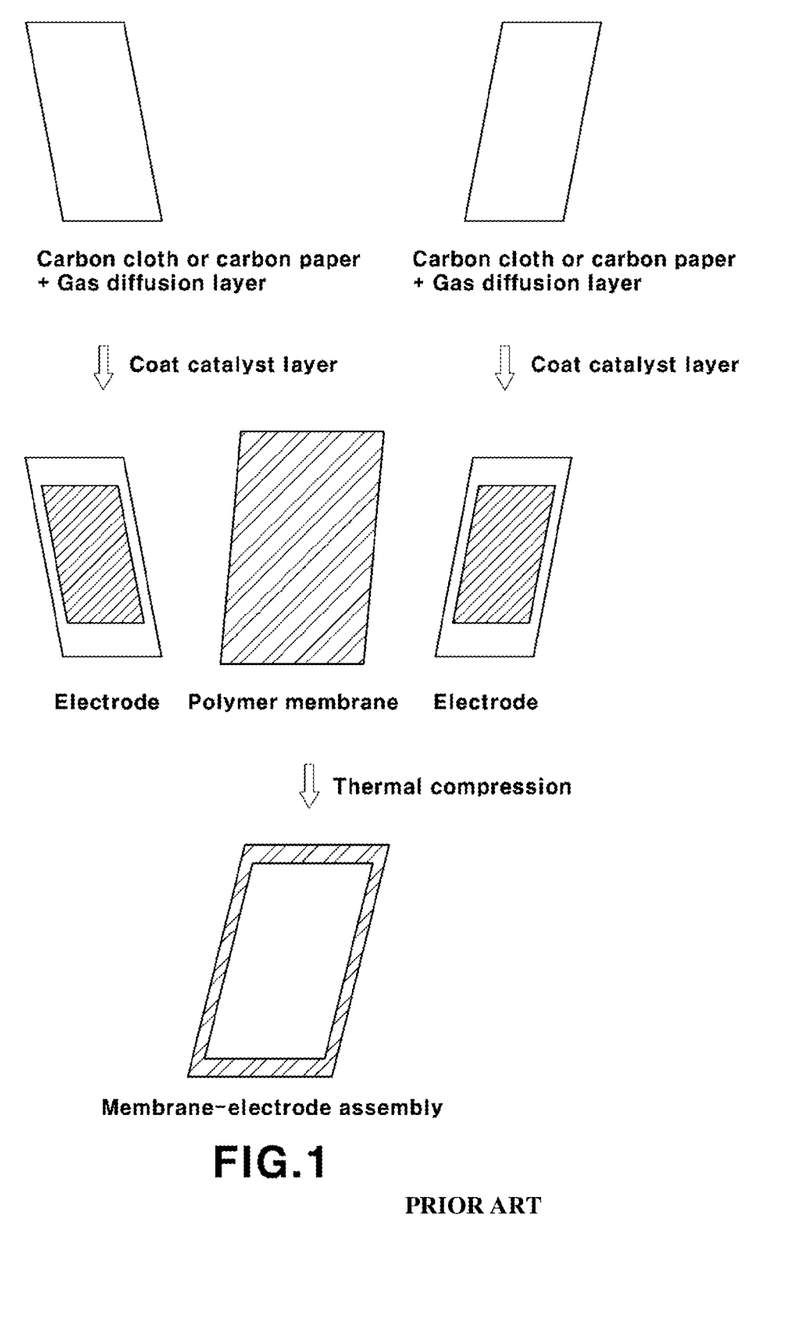
FIG. 1 is a schematic diagram showing a method for manufacturing a membrane-electrode assembly by coating a catalyst layer on a gas diffusion layer to form an electrode and bonding the electrode to a polymer membrane by thermal compression.
Figure 2:
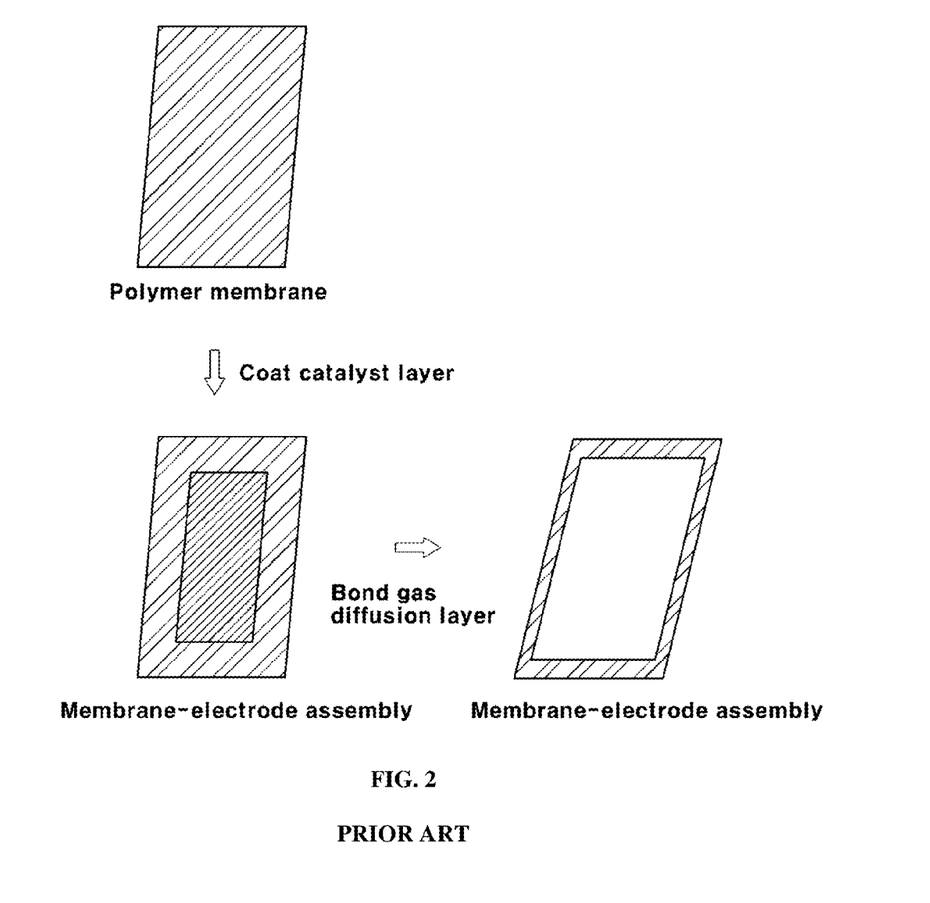
FIG. 2 is a schematic diagram showing a method for manufacturing a membrane-electrode assembly by coating a catalyst layer directly on a polymer membrane and bonding the polymer membrane to a gas diffusion layer.
Figure 3:
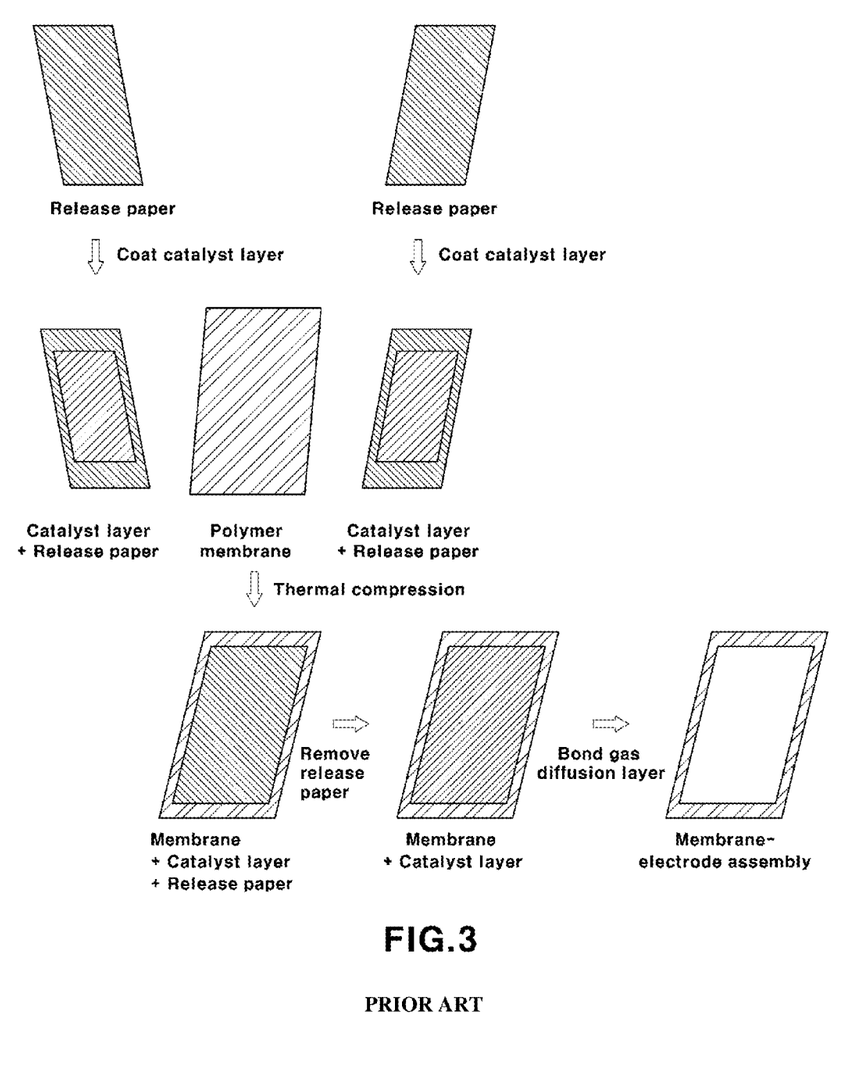
FIG. 3 is a schematic diagram showing a method for manufacturing a membrane-electrode assembly by coating a catalyst layer on a release paper, transferring the catalyst layer on the release paper to a polymer membrane, and bonding the polymer membrane to a gas diffusion layer.

Conventional methods for manufacturing membrane-electrode assemblies will be described below. As shown in FIG. 1, a catalyst slurry is coated, sprayed or painted on a gas diffusion layer to form an electrode, and the electrode is bonded to a polymer electrode membrane by thermal compression. Alternatively, as shown in FIG. 2, a catalyst slurry is coated, sprayed or painted directly on a polymer membrane and the resulting polymer membrane is bonded to a gas diffusion layer. In another alternative, as shown in FIG. 3, a catalyst slurry is coated, sprayed or painted on a release paper and transferred to a polymer membrane to form an electrode, and the electrode is bonded to a gas diffusion layer.

The aforementioned conventional art methods suffer from numerous disadvantages. For example, when the catalyst slurry is applied to the gas diffusion layer, it becomes difficult to manufacture the MEA consequently, this method is not commercially viable. A further disadvantage of the method of directly forming the catalyst layer on the polymer membrane is that it becomes difficult to manufacture an electrode with a large surface area due to deformation of the polymer membrane. Another disadvantage of the method of forming the catalyst layer on the release paper and transferring the catalyst layer to the polymer membrane is that the catalyst layer may be cracked depending upon the thickness of the catalyst layer, the content of a binder, and the type of the catalyst; consequently, the catalyst layer may be lost during transfer to the polymer membrane. Moreover, after the catalyst layer is transferred to the polymer membrane, cracks may be formed in the catalyst layer such that the polymer membrane is directly exposed to the gas supply channel of the separator through the cracks, thereby deteriorating the performance and durability of the fuel cell.

Another factor that decreases the durability of the manufactured MEA is that the polymer electrolyte membrane is broken down due to chemical instability, which occurs during both operation and idle states of the fuel cell. Moreover, the breakdown of the polymer electrolyte membrane is caused directly by hydroxyl radicals (OH radicals), which are generated by hydrogen peroxide, which is produced when oxygen or hydrogen diffuse through the polymer membrane, and also during the reaction at the oxygen electrode. The hydroxyl radicals break down the functional group ($—SO_3H$) at the end of the polymer electrolyte (binder), which serves to decrease the conductivity of hydrogen ions, thereby deteriorating the performance of the fuel cell.

Another factor that decreases the durability of the manufactured MEA is that the voltage and current of the vehicle fuel cell are significantly altered by the operating conditions of the vehicle. For example, significant changes in the voltage of the fuel cell frequently occur during vehicle operations such as starting, stopping, accelerating, decelerating, etc. As a result, the catalyst deteriorates more rapidly, thereby reducing the durability of the fuel cell. In particular, such voltage changes have a greater effect on the cathode than in the anode; consequently, the growth, dissolution, and agglomeration of catalyst particles occurs to a more significant degree in the cathode, thereby reducing the performance of the fuel cell.

The above information disclosed in this Background section is only for enhancement of understanding of the background of the invention.

SUMMARY OF THE DISCLOSURE

The present invention provides compositions for a fuel cell electrode that includes carbon nanotubes, cerium-zirconium oxide particles, an alloy catalyst, and an agglomeration of platinum, and a method for manufacturing a membrane-electrode assembly using the same. The addition of carbon nanotubes helps to reinforce the mechanical strength of the electrode, which improves the performance and durability of the fuel cell electrode, and also reduces the amount of platinum required, which reduces the manufacturing cost. The addition of cerium-zirconium oxide particles helps to prevent corrosion of the polymer electrolyte membrane due to reaction by-products. The addition of an alloy catalyst prepared by alloying a second metal (such as, e.g., Ir, Pd, Cu, Co, Cr, Ni, Mn, Mo, Au, Ag, V, and the like) with platinum serves to prevent the dissolution, migration, and agglomeration of platinum within the electrode.

In one aspect, the present invention provides a fuel cell electrode including a quaternary alloy catalyst prepared by supporting cerium-zirconium oxide particles having a size of about 1 to about 100 nm on a carbon support and supporting platinum and a second metal having a size of about 1 to about 100 nm on a carbon support. In another embodiment, the quaternary alloy catalyst is prepared by supporting cerium-zirconium oxide particles having a size of 1 to 100 nm on a carbon support and supporting platinum and a second metal having a size of 1 to 100 nm on a carbon support.

In another aspect, the present invention provides a fuel cell electrode including a mixture of a binary alloy catalyst, prepared by supporting platinum and a second metal on a carbon support, and cerium-zirconium oxide particles having a size of about 1 to about 100 nm. In another embodiment, the cerium-zirconium oxide particles have a size of 1 to 100 nm.

In still another aspect, the present invention provides a fuel cell electrode including a mixture of a binary alloy catalyst, prepared by supporting platinum and a second metal on a carbon support, and cerium-zirconium oxide particles having a size of about 1 to about 100 nm supported on a carbon support. In another embodiment, the cerium-zirconium oxide particles have a size of 1 to 100 nm.

In yet another aspect, the present invention provides a fuel cell electrode including a mixture of a quaternary alloy catalyst, carbon nanofibers, and a polymer electrolyte solution, the quaternary alloy catalyst being prepared by supporting cerium-zirconium oxide particles having a size of about 1 to about 100 nm on a carbon support and supporting platinum and a second metal having a size of about 1 to about 100 nm on a carbon support. In another embodiment, the quaternary alloy catalyst is prepared by supporting cerium-zirconium oxide particles having a size of 1 to 100 nm on a carbon support and supporting platinum and a second metal having a size of 1 to 100 nm on a carbon support.

In yet another aspect, the present invention provides a fuel cell electrode including a mixture of a first binary alloy catalyst, prepared by supporting platinum and a second metal on a carbon support, and a second binary alloy catalyst, prepared by supporting platinum and another second metal on a carbon support.

In a further aspect, the present invention provides a fuel cell electrode including a mixture prepared by mixing a binary alloy catalyst, prepared by supporting platinum and a second metal on a carbon support, with cerium-zirconium oxide particles having a size of about 1 to about 100 nm and further mixing the resulting binary alloy catalyst with carbon nanofibers and a polymer electrolyte solution. In another embodiment, the cerium-zirconium oxide particles have a size of 1 to 100 nm In some exemplary embodiments, the binary alloy catalyst may comprise about 0.1 to about 5 parts by weight of cerium, about 0.1 to about 5 parts by weight of zirconium, about 1 to about 50 parts by weight of a second metal, and about 10 to about 2,000 parts by weight of a carbon support, where the parts by weight range values for cerium, zirconium, the second metal, and the carbon support are determined with respect to a value of about 100 parts by weight of platinum. In other exemplary embodiments, the binary alloy catalyst may comprise 0.1 to 5 parts by weight of cerium, 0.1 to 5 parts by weight of zirconium, 1 to 50 parts by weight of a second metal, and 10 to 2,000 parts by weight of a carbon support, where the parts by weight range values for cerium, zirconium, the second metal, and the carbon support are determined with respect to a value of 100 parts by weight of platinum.

In other exemplary embodiments, the carbon nanofibers may be used in an amount of about 1 to about 200 parts by weight with respect to about 100 parts by weigh of platinum, and the polymer electrolyte is used in an amount of about 50 to about 500 parts by weight with respect to about 100 parts by weigh of platinum. In still other exemplary embodiments, the carbon nanofibers may be used in an amount of 1 to 200 parts by weight with respect to 100 parts by weigh of platinum, and the polymer electrolyte is used in an amount of 50 to 500 parts by weight with respect to 100 parts by weigh of platinum.

In other exemplary embodiments, the carbon support may be selected from the group consisting of active carbon (with a particle diameter of about 1 to about 1,000 nm), carbon nanofibers (with a fiber diameter of about 1 to about 1,000 nm and a length of about 0.1 to about 1,000 μm) and graphitized carbon (with a particle diameter of about 1 to about 1,000 nm). In other exemplary embodiments, the carbon support may be selected from the group consisting of active carbon (with a particle diameter of 1 to 1,000 nm), carbon nanofibers (with a fiber diameter of 1 to 1,000 nm and a length of 0.1 to 1,000 μm) and graphitized carbon (with a particle diameter of 1 to 1,000 nm).

In yet another exemplary embodiment, the second metal may be selected from the group consisting of Ir, Pd, Co, Cr, Cu, Mo, Mn, V, and the like.

In still other exemplary embodiments, the carbon nanofibers may be selected from the group consisting of carbon nanotubes, carbon nanofibers, carbon nanowires, carbon nanohorns, carbon nanorings, and the like.

In a further exemplary embodiment, the carbon nanofibers may have a diameter of about 5 to about 100 nm. In another exemplary embodiment, the carbon nanofibers may have a diameter of 5 to 100 nm.

In other aspects, the present invention provides a method for manufacturing a membrane-electrode assembly, the method including: preparing a catalyst slurry by mixing the fuel cell electrode as described herein with a solvent and a polymer electrolyte solution; coating the catalyst slurry on a release paper to form an electrode; drying the electrode; and bonding the dried electrode to a polymer electrolyte membrane by thermal compression.

In an exemplary embodiment, the method may further comprise milling the catalyst slurry using a planetary bead mill such that the catalyst of the catalyst slurry has a small and uniform particle size.

In another exemplary embodiment, the catalyst slurry may have a solid content of about 5 to about 30 wt % as the total weight of catalysts, carbon nanofibers, and ionomers. In another exemplary embodiment, the catalyst slurry may have a solid content of 5 to 30 wt % as the total weight of catalysts, carbon nanofibers, and ionomers.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9.

Example 1

Figure 4:
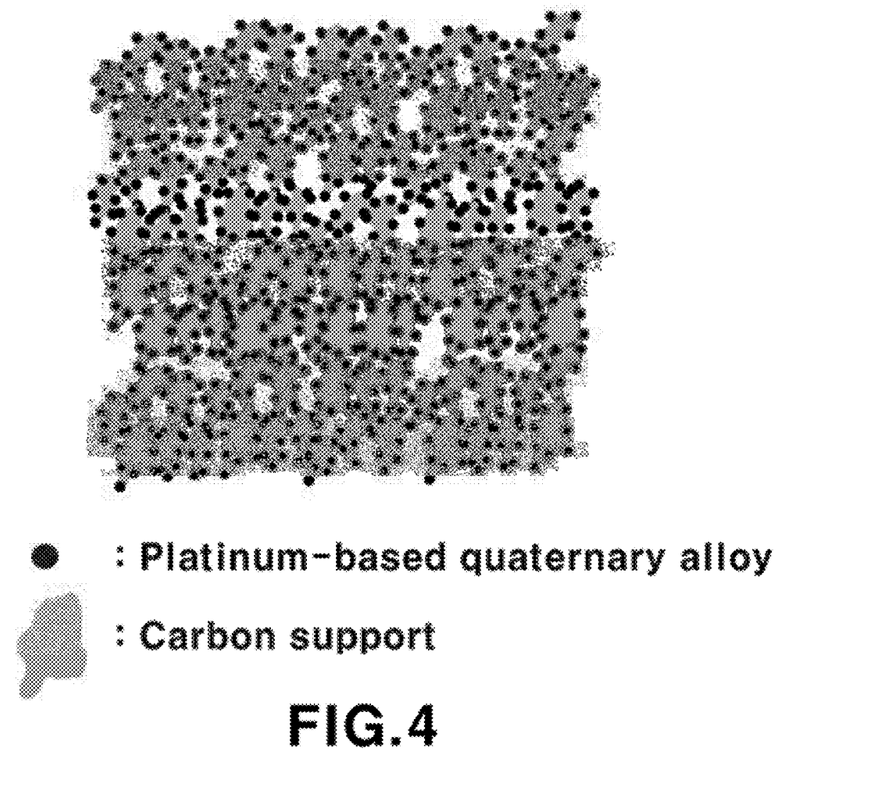
FIG. 4 is a schematic diagram showing a fuel cell electrode in accordance with Example 1 of the present invention.

As shown in the conceptual diagram of FIG. 4, a fuel cell electrode in accordance with Example 1 of the present invention may be formed with a platinum-based quaternary alloy catalyst prepared by supporting cerium-zirconium oxide particles, platinum, and particles of a second metal on a support, where the cerium-zirconium oxide particles have a size of 1 to 100 nm, and the second metal particles have a size of 1 to 100 nm The quaternary alloy catalyst of Example 1 includes 0.1 to 5 parts by weight of cerium, 0.1 to 5 parts by weight of zirconium, 1 to 50 parts by weight of a second metal, and 10 to 2,000 parts by weight of a carbon support, where the parts by weight range values for cerium, zirconium, the second metal, and the carbon support are determined with respect to a value of 100 parts by weight of platinum. It is contemplated within the scope of the invention that the cerium or zirconium may be added at a range of 0.1 to 0.5, 1, 1.5, 2, 2.5, 3, 3.5, 4, 4.5, or 5 parts by weight, or alternatively a range of 5 to 4.5, 4, 3.5, 3, 2.5, 2, 1.5, 1, or 0.5 parts by weight, with respect to a value of 100 parts by weight of platinum. It is similarly contemplated that the second metal may be added at a range of 1 to 5, 10, 15, 20, 25, 30, 35, 40, 45, or 50 parts by weight, or alternatively a range of 50 to 45, 40, 35, 30, 25, 20, 15, 10, 5, or 1 parts by weight, with respect to a value of 100 parts by weight of platinum. It is similarly contemplated that the carbon support may be added at a range of 10 to 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or 2000 part by weight, or alternatively at a range of 2000 to 1950, 1900, 1850, 1800, 1750, 1700, 1650, 1600, 1550, 1500, 1450, 1400, 1350, 1300, 1250, 1200, 1150, 1100, 1050, 1000, 950, 900, 850, 800, 750, 700, 650, 600, 550, 500, 450, 400, 350, 300, 250, 200, 150, 100, 50, or 10 parts by weight, with respect to a value of 100 parts by weight of platinum.

In particular, the second metal may be a transition metal other than platinum, cerium, and zirconium such as, for example, Ir, Pd, Co, Cr, Cu, Mo, Mn, V, and the like.

Preferably, the carbon support is selected from the group consisting of active carbon (with a particle diameter of 1 to 1,000 nm), carbon nanofibers (with a fiber diameter of 1 to 1,000 nm and a length of 0.1 to 1,000 μm), and graphitized carbon (with a particle diameter of 1 to 1,000 nm). Additionally, carbon nanofibers used for the carbon support may include any carbon nanofibers having the same or similar mechanical properties such as, for example, carbon nanotubes, carbon nanofibers, carbon nanowires, carbon nanohorns, carbon nanorings, and the like. While various carbon nanofiber structures can be used, carbon nanofiber structures having a high degree of straightness in the longitudinal direction provide especially desirable effects.

Preferably, the carbon nanofibers have a diameter of 5 to 100 nm and a length of several hundreds of nanometers (such as, e.g., 100 nm, 150 nm, 200 nm, 250 nm, 300 nm, 350 nm, 400 nm, 450 nm, 500 nm, 550 nm, 600 nm, 650 nm, 700 nm, 750 nm, 800 nm, 850 nm, 900 nm, 950 nm, 1000 nm, and the like). Carbon nanofibers with a diameter of less than 5 nm are not preferred because such carbon nanofibers tend to agglomerate, which has the negative effect of creating a non-uniform catalyst slurry. Carbon nanofibers with a diameter of more than 100 nm are also not preferred because their ability to bond to the catalyst layer is reduced, which has the negative effect of causing physical damage to the catalyst layer. Accordingly, it is preferable that carbon nanofibers having a diameter of 5 to 100 nm be used.

Here, a membrane-electrode assembly according to the present invention may be manufactured by a method comprising the steps of preparing a catalyst slurry by mixing the fuel cell electrode in accordance with Example 1, i.e., the quaternary alloy catalyst, with a solvent and a polymer electrolyte solution, milling the catalyst slurry using a planetary bead mill such that the catalyst of the catalyst slurry has a small and uniform particle size, coating the milled catalyst slurry on a release paper to form an electrode, drying the electrode, and bonding the dried electrode to a polymer electrolyte membrane by thermal compression. The catalyst slurry may have a solid content of 5 to 30 wt % as the total weight of catalysts, carbon nanofibers, and ionomers.

Example 2

Figure 5:
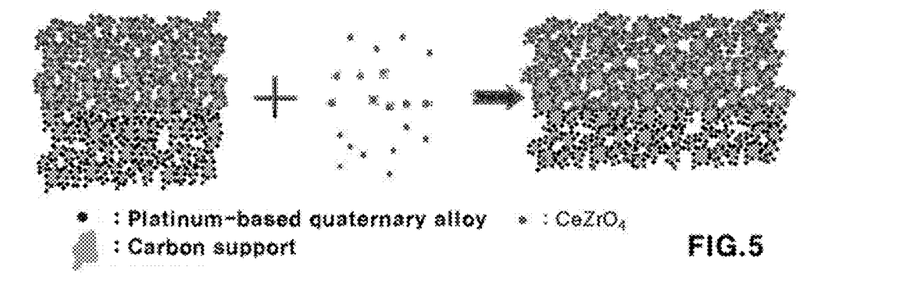
FIG. 5 is a schematic diagram showing a fuel cell electrode in accordance with Example 2 of the present invention.

As shown in the conceptual diagram of FIG. 5, a fuel cell electrode in accordance with Example 2 of the present invention is formed by mixing a binary alloy catalyst, which is prepared by supporting platinum and a second metal on a carbon support, with cerium-zirconium oxide particles having a size of 1 to 100 nm.

The fuel cell electrode of Example 2 includes 0.1 to 5 parts by weight of cerium, 0.1 to 5 parts by weight of zirconium, 1 to 50 parts by weight of a second metal, and 10 to 2,000 parts by weight of a carbon support, where the parts by weight range values for cerium, zirconium, the second metal, and the carbon support are determined with respect to a value of 100 parts by weight of platinum.

In particular, the second metal may be a transition metal other than platinum, cerium, and zirconium such as, for example, Ir, Pd, Co, Cr, Cu, Mo, Mn, V, and the like.

Preferably, the carbon support is selected from the group consisting of active carbon (with a particle diameter of 1 to 1,000 nm, which is understood to include all sub-ranges such as, for example, 1 to 100, 200, 300, 400, 500, 600, 700, 800, 900, or 1000 nm, or 1000 to 900, 800, 700, 600, 500, 400, 300, 200, 200, 100, or 1 nm), carbon nanofibers (with a fiber diameter of 1 to 1,000 nm, which is understood to include all sub-ranges such as, for example, 1 to 100, 200, 300, 400, 500, 600, 700, 800, 900, or 1000 nm, or 1000 to 900, 800, 700, 600, 500, 400, 300, 200, 200, 100, or 1 nm and a length of 0.1 to 1,000 µm, which is understood to include all sub-ranges such as, for example, 0.1 to 0.5, 1, 5, 10, 50, 100, 200, 300, 400, 500, 600, 700, 800, 900, or 1000 nm, or 1000 to 900, 800, 700, 600, 500, 400, 300, 200, 200, 100, 50, 10, 5, 1, 0.5, or 0.1 nm), and graphitized carbon (with a particle diameter of 1 to 1,000 nm, which is understood to include all sub-ranges such as, for example, 1 to 100, 200, 300, 400, 500, 600, 700, 800, 900, or 1000 nm, or 1000 to 900, 800, 700, 600, 500, 400, 300, 200, 200, 100, or 1 nm). Additionally, carbon nanofibers used for the carbon support may include any carbon nanofibers having the same or similar mechanical properties such as, for example, carbon nanotubes, carbon nanofibers, carbon nanowires, carbon nanohorns, carbon nanorings, and the like. While various carbon nanofiber structures can be used, carbon nanofiber structures having a high degree of straightness in the longitudinal direction provide especially desirable effects.

Here, a membrane-electrode assembly according to the present invention may be manufactured by a method comprising the steps of preparing a catalyst slurry by mixing the fuel cell electrode in accordance with Example 2, i.e., the mixture of the binary alloy catalyst, prepared by supporting platinum and a second metal on a carbon support, and cerium-zirconium oxide particles having a size of 1 to 100 nm, with a solvent and a polymer electrolyte solution, milling the catalyst slurry using a planetary bead mill such that the catalyst of the catalyst slurry has a small and uniform particle size, coating the milled catalyst slurry on a release paper to form an electrode, drying the electrode, and bonding the dried electrode to a polymer electrolyte membrane by thermal compression. The catalyst slurry may have a solid content of 5 to 30 wt % as the weight of catalyst, carbon nanofibers, and ionomer.

Example 3

Figure 6:
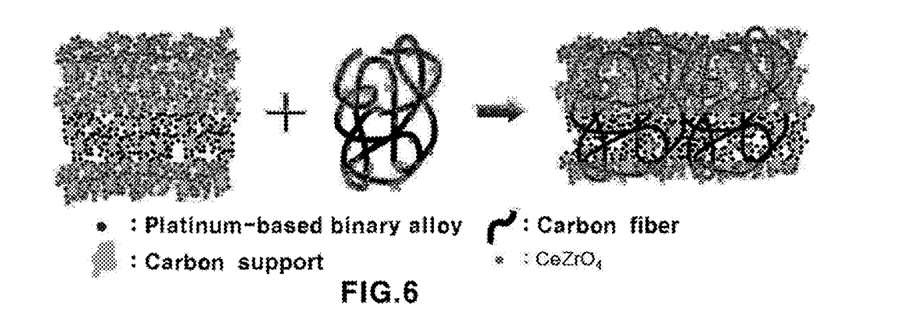
FIG. 6 is a schematic diagram showing a fuel cell electrode in accordance with Example 3 of the present invention.

As shown in the conceptual diagram of FIG. 6, a fuel cell electrode in accordance with Example 3 of the present invention is formed from a mixture of a binary alloy catalyst, prepared by supporting platinum and a second metal on a carbon support, and cerium-zirconium oxide particles having a size of 1 to 100 nm supported on a carbon support.

Similarly, the fuel cell electrode of Example 3 comprises 0.1 to 5 parts by weight of cerium, 0.1 to 5 parts by weight of zirconium, 1 to 50 parts by weight of a second metal, and 10 to 2,000 parts by weight of a carbon support, where the parts by weight range values for cerium, zirconium, the second metal, and the carbon support are determined with respect to a value of 100 parts by weight of platinum.

Preferably, the carbon support is selected from the group consisting of active carbon (with a particle diameter of 1 to 1,000 nm), carbon nanofibers (with a fiber diameter of 1 to 1,000 nm and a length of 0.1 to 1,000 µm) and graphitized carbon (with a particle diameter of 1 to 1,000 nm).

The second metal may be a transition metal other than platinum, cerium, and zirconium such as, for example, Ir, Pd, Co, Cr, Cu, Mo, Mn, V, and the like. Additionally, carbon nanofibers used for the carbon support may include any carbon nanofibers having the same or similar mechanical properties such as, for example, carbon nanotubes, carbon nanofibers, carbon nanowires, carbon nanohorns, carbon nanorings, and the like. While various carbon nanofiber structures can be used, carbon nanofiber structures having a high degree of straightness in the longitudinal direction provide especially desirable effects.

Here, a membrane-electrode assembly according to the present invention may be manufactured by a method comprising the steps of preparing a catalyst slurry by mixing the fuel cell electrode in accordance with Example 3, i.e., the mixture of the binary alloy catalyst, prepared by supporting platinum and a second metal on a carbon support, and cerium-zirconium oxide particles having a size of 1 to 100 nm supported on a carbon support, with a solvent and a polymer electrolyte solution, milling the catalyst slurry using a planetary bead mill such that the catalyst of the catalyst slurry has a small and uniform particle size, coating the milled catalyst slurry on a release paper to form an electrode, drying the electrode, and bonding the dried electrode to a polymer electrolyte membrane by thermal compression. The catalyst slurry may have a solid content of 5 to 30 wt % as the weight of catalyst, carbon nanofibers, and ionomer.

Example 4

Figure 7:
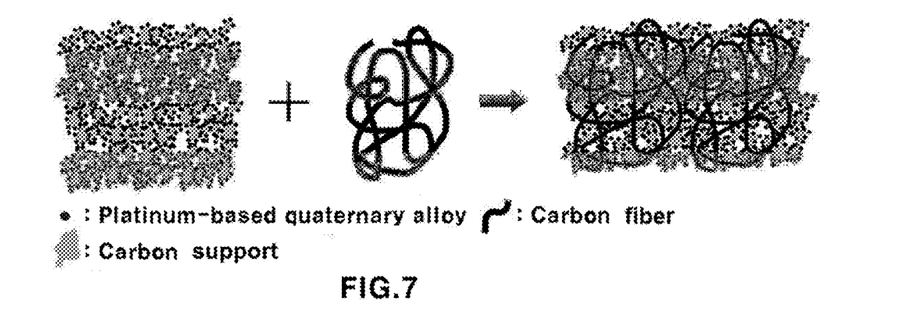
FIG. 7 is a schematic diagram showing a fuel cell electrode in accordance with Example 4 of the present invention.

As shown in the conceptual diagram of FIG. 7, a fuel cell electrode in accordance with Example 4 of the present invention is formed of a mixture of a quaternary alloy catalyst, carbon nanofibers, and a polymer electrolyte solution, the quaternary alloy catalyst being prepared by supporting cerium-zirconium oxide particles having a size of 1 to 100 nm on a carbon support and supporting platinum and a second metal having a size of 1 to 100 nm on a carbon support.

Likewise, the quaternary alloy catalyst of Example 4 comprises 0.1 to 5 parts by weight of cerium, 0.1 to 5 parts by weight of zirconium, 1 to 50 parts by weight of a second metal, and 10 to 2,000 parts by weight of a carbon support, where the parts by weight range values for cerium, zirconium, the second metal, and the carbon support are determined with respect to a value of 100 parts by weight of platinum.

The carbon nanofibers have a diameter of 5 to 100 nm and are used in an amount of 1 to 200 parts by weight with respect to 100 parts by weigh of platinum, and the polymer electrolyte is used in an amount of 50 to 500 parts by weight with respect to 100 parts by weigh of platinum. The carbon nanofibers may be selected from the group consisting of carbon nanotubes, carbon nanofibers, carbon nanowires, carbon nanohorns, carbon nanorings, and the like.

Preferably, the carbon support is selected from the group consisting of active carbon (with a particle diameter of 1 to 1,000 nm), carbon nanofibers (with a fiber diameter of 1 to 1,000 nm and a length of 0.1 to 1,000 μm), and graphitized carbon (with a particle diameter of 1 to 1,000 nm), and the second metal is a transition metal other than platinum, cerium, and zirconium such as, for example, Ir, Pd, Co, Cr, Cu, Mo, Mn, V, and the like.

A membrane-electrode assembly according to the present invention may be manufactured by a method comprising the steps of preparing a catalyst slurry by mixing the fuel cell electrode in accordance with Example 4, i.e., the mixture of the quaternary alloy catalyst, the carbon nanofibers, and the polymer electrolyte solution, with a solvent and a polymer electrolyte solution, the quaternary alloy catalyst being prepared by supporting cerium-zirconium oxide particles having a size of 1 to 100 nm on a carbon support and supporting platinum and a second metal having a size of 1 to 100 nm on a carbon support, milling the catalyst slurry using a planetary bead mill such that the catalyst of the catalyst slurry has a small and uniform particle size, coating the milled catalyst slurry on a release paper to form an electrode, drying the electrode, and bonding the dried electrode to a polymer electrolyte membrane by thermal compression. The catalyst slurry may have a solid content of 5 to 30 wt % as the weight of catalyst, carbon nanofibers, and ionomer.

Example 5

Figure 8:
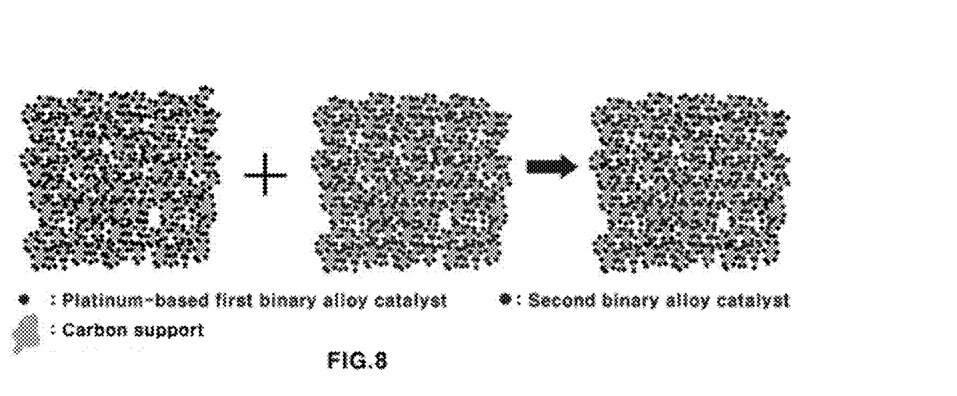
FIG. 8 is a schematic diagram showing a fuel cell electrode in accordance with Example 5 of the present invention.

As shown in the conceptual diagram of FIG. 8, a fuel cell electrode in accordance with Example 5 of the present invention is formed of a mixture of a first binary alloy catalyst, prepared by supporting platinum and a second metal on a carbon support, and a second binary alloy catalyst, prepared by supporting platinum and another second metal on a carbon support.

Here, the second metal of the first binary alloy catalyst may be a transition metal other than platinum, cerium, and zirconium such as, for example, Ir, Pd, Co, Cr, Cu, Mo, Mn, V, and the like, and the second metal of the second binary alloy catalyst may be a transition metal other than platinum, cerium, and zirconium such as, for example, Ir, Pd, Co, Cr, Cu, Mo, Mn, V, and the like, other than the second metal of the first binary alloy catalyst selected.

Preferably, the carbon support is selected from the group consisting of active carbon (with a particle diameter of 1 to 1,000 nm), carbon nanofibers (with a fiber diameter of 1 to 1,000 nm and a length of 0.1 to 1,000 μm), and graphitized carbon (with a particle diameter of 1 to 1,000 nm).

When the platinum-based first binary alloy catalyst and the platinum-based second binary alloy catalyst are mixed together, the advantages of the first binary alloy catalyst and the second binary alloy catalyst can be combined in one electrode. Moreover, unlike a tertiary alloy catalyst, when the first binary alloy catalyst and the second binary alloy catalyst are mixed together, the manufacturing process is facilitated, their overall effectiveness can be significantly improved, and the first or second binary alloy catalyst may be replaced with a platinum catalyst.

Example 6

Figure 9:
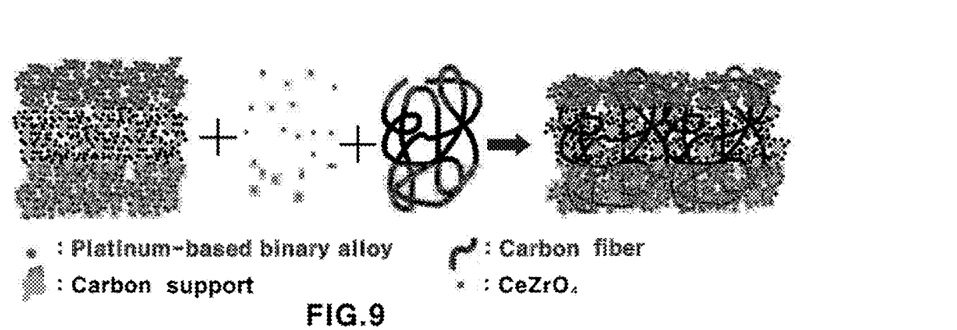
FIG. 9 is a schematic diagram showing a fuel cell electrode in accordance with Example 6 of the present invention.

As shown in the conceptual diagram of FIG. 9, a fuel cell electrode in accordance with Example 6 of the present invention is formed of a mixture prepared by mixing a binary alloy catalyst, prepared by supporting platinum and a second metal on a carbon support, with cerium-zirconium oxide particles having a size of 1 to 100 nm, and further mixing the resulting binary alloy catalyst with carbon nanofibers and a polymer electrolyte solution.

Likewise, the fuel cell electrode of Example 6 comprises 0.1 to 5 parts by weight of cerium, 0.1 to 5 parts by weight of zirconium, 1 to 50 parts by weight of a second metal, and 10 to 2,000 parts by weight of a carbon support, where the parts by weight range values for cerium, zirconium, the second metal, and the carbon support are determined with respect to a value of 100 parts by weight of platinum.

Moreover, the carbon nanofibers have a diameter of 5 to 100 nm and are used in an amount of 1 to 200 parts by weight with respect to 100 parts by weight of platinum, and the polymer electrolyte is used in an amount of 50 to 500 parts by weight with respect to 100 parts by weigh of platinum. The carbon nanofibers are selected from the group consisting of carbon nanotubes, carbon nanofibers, carbon nanowires, carbon nanohorns, carbon nanorings, and the like.

Preferably, the carbon support is selected from the group consisting of active carbon (with a particle diameter of 1 to 1,000 nm), carbon nanofibers (with a fiber diameter of 1 to 1,000 nm and a length of 0.1 to 1,000 μm), and graphitized carbon (with a particle diameter of 1 to 1,000 nm), and the second metal is a transition metal other than platinum, cerium, and zirconium such as, for example, Ir, Pd, Co, Cr, Cu, Mo, Mn, V, and the like.

A membrane-electrode assembly according to the present invention may be manufactured by a method including the steps of preparing a catalyst slurry by mixing the fuel cell electrode in accordance with Example 6, i.e., the mixture prepared by mixing the binary alloy catalyst, prepared by supporting platinum and a second metal on a carbon support, with cerium-zirconium oxide particles having a size of 1 to 100 nm and further mixing the resulting binary alloy catalyst with carbon nanofibers and a polymer electrolyte solution, milling the catalyst slurry using a planetary bead mill such that the catalyst of the catalyst slurry has a small and uniform particle size, coating the milled catalyst slurry on a release paper to form an electrode, drying the electrode, and bonding the dried electrode to a polymer electrolyte membrane by thermal compression. The catalyst slurry may have a solid content of 5 to 30 wt % as the weight of catalyst, carbon nanofibers, and ionomer.

Test Examples

In Comparative Example 1, a membrane-electrode assembly was formed by bonding a fuel cell electrode as a catalyst prepared simply by supporting platinum on carbon to a polymer electrolyte membrane by thermal compression, and the current density and the electrochemical active surface area (ESA) of platinum were measured. In Comparative Example, a commercially available product was tested under the same conditions to compare the performance and durability.

In an Example for the test, a fuel cell electrode in accordance with the above-described Example 6 was formed, and the thus formed electrode was bonded to a polymer electrolyte membrane by thermal compression, thereby manufacturing a membrane-electrode assembly.

Specifically, a fuel cell electrode was formed by preparing a catalyst by supporting an alloy of platinum and iridium and mixing the prepared catalyst with cerium-zirconium oxide particles and carbon nanofibers, and the resulting electrode was bonded to a polymer electrolyte membrane by thermal compression, thereby manufacturing a membrane-electrode assembly. Then, the current density and the electrochemical active surface area (ESA) of platinum were measured.

Figure 10:
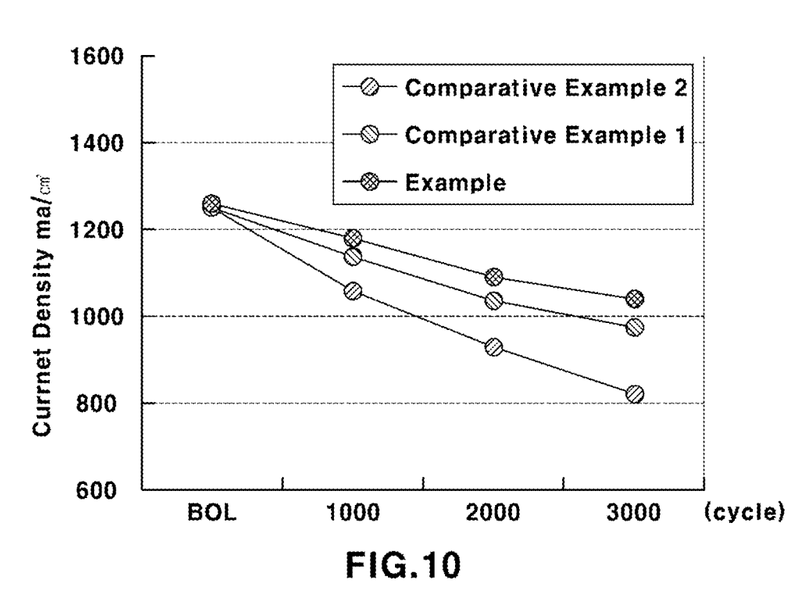
FIGS. 10 through 12 are graphs showing the results of testing the properties of fuel cell electrodes according to the present invention and those according to the prior art.

As a result of the measurement, it can be seen that the electrode in accordance with the Example of the present invention has a high current density, as shown in FIG. 10, although the amount of platinum used was 12% less than that of Comparative Examples 1 and 2.

Figure 11:
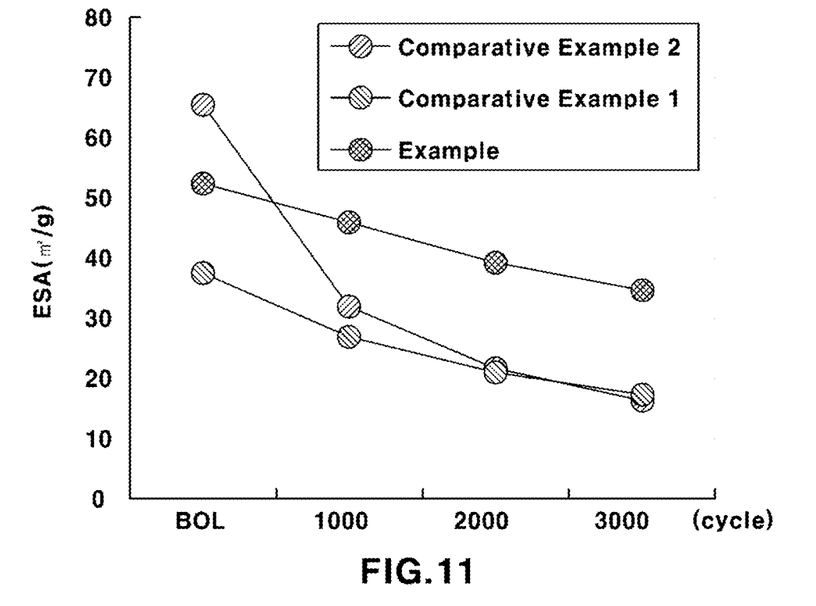

Moreover, as a result of the open circuit voltage (OCV). durability test for accelerating the deterioration of the catalyst itself, as shown in FIG. 11, it can be seen that the reduction in the active surface area of the membrane-electrode assembly in accordance with the Example of the present invention was improved by more than 20% relative to Comparative Example 1, and more than 40% relative to Comparative Example 2, after the durability test was continued for 3,000 cycles.

Figure 12:
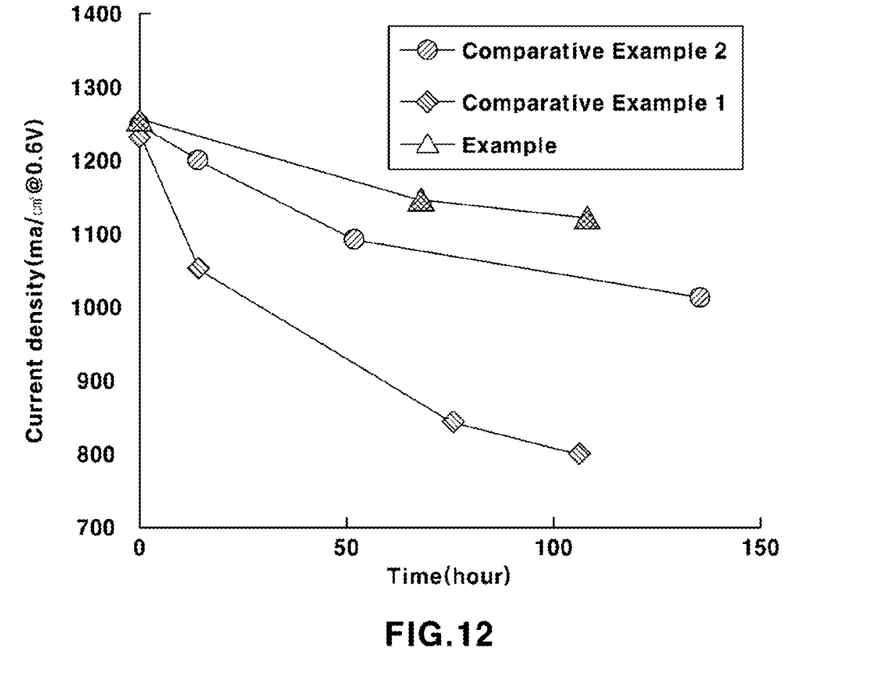

Furthermore, as a result of the OCV durability test for accelerating the deterioration of the polymer electrolyte in the electrode, as shown in FIG. 12, it can be seen that the reduction in the current density of the membrane-electrode assembly in accordance with the Example of the present invention was improved by 25% relative to Comparative Example 1 and 6% relative to Comparative Example 2. As a result, the fuel cell electrode and the membrane-electrode assembly using the same electrode according to the present invention can provide high durability even with a small amount of platinum.

As described above, the present invention provides the following effects. Since the fuel cell electrode is formed of a mixture of an alloy of platinum and a second metal and cerium-zirconium oxide particles, it is possible to improve the durability and utilization of the catalyst metal as the fuel cell electrode and, at the same time, prevent corrosion of the polymer electrolyte.

In particular, the fuel cell electrode is formed by preparing an alloy catalyst by supporting platinum and a second metal on carbon supported with cerium-zirconium oxide particles, and mixing the resulting catalyst with carbon nanofibers and a polymer electrolyte solution, to produce a fuel cell electrode, which can then be used to manufacture the membrane-electrode assembly (MEA). Accordingly, it is possible to improve the durability of the MEA and reduce the amount of platinum used.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of producing a fuel cell electrode comprising:
preparing a binary alloy catalyst by combining platinum and a second metal on a carbon support, and
mixing the binary alloy catalyst with cerium-zirconium oxide particles,
wherein the cerium-zirconium oxide particles having a size of about 1 to about 100 nm is supported on carbon nanofibers having a fiber diameter of 1 to 1,000 nm and a length of 0.1 to 1,000 µm and then the platinum and the second metal having a size of about 1 to about 100 nm are supported on the carbon support selected from the group consisting of active carbon having a particle diameter of 1 to 1,000 nm and graphitized carbon having a particle diameter of 1 to 1,000 nm.

2. A method for manufacturing a membrane-electrode assembly:
preparing a catalyst slurry by mixing a fuel cell electrode with a solvent and a polymer electrolyte solution;
coating the catalyst slurry on a release paper to form an electrode;
drying the electrode; and
bonding the dried electrode to a polymer electrolyte membrane by thermal compression, wherein the fuel cell electrode comprises a quaternary alloy catalyst comprising platinum, cerium and zirconium oxide particles, particles of a second metal, carbon nanofibers and at least one carbon support,
wherein the quaternary alloy catalyst is formed by supporting the cerium-zirconium oxide particles having a size of about 1 to about 100 nm on the carbon nanofibers having a fiber diameter of 1 to 1,000 nm and a length of 0.1 to 1,000 µm and supporting the platinum and the particles of the second metal having a size of about 1 to about 100 nm on the at least one carbon support selected from the group consisting of active carbon having a particle diameter of 1 to 1,000 nm and graphitized carbon having a particle diameter of 1 to 1,000 nm.

3. A method of manufacturing a fuel cell cathode comprising platinum, cerium and zirconium oxide particles, particles of a second metal, carbon nanofibers and at least one carbon support, which form a quaternary alloy catalyst, wherein the quaternary alloy catalyst is prepared by supporting cerium-zirconium oxide particles having a size of about 1 to about 100 nm on the carbon nanofibers having a fiber diameter of 1 to 1,000 nm and a length of 0.1 to 1,000 µm and supporting the platinum and the particles of the second metal having a size of about 1 to about 100 nm on the at least one carbon support selected from the group consisting of active carbon having a particle diameter of 1 to 1,000 nm and graphitized carbon having a particle diameter of 1 to 1,000 nm.

* * * * *